United States Patent [19]

Chern

[11] Patent Number: 4,832,324
[45] Date of Patent: May 23, 1989

[54] FIXTURE FOR HOLDING DIFFERENT WORKPIECES IN DIFFERENT POSITIONS THEREON

[76] Inventor: Yan H. Chern, No. 97-1, Chung Ching Rd., Taichung City, Taiwan

[21] Appl. No.: 117,019

[22] Filed: Nov. 4, 1987

[51] Int. Cl.$^4$ .............................................. B23Q 3/02
[52] U.S. Cl. ..................................... 269/91; 269/303; 269/319; 269/900
[58] Field of Search ............... 269/303, 900, 305, 315, 269/319, 91, 92, 93, 94, 283; 33/552, 645; 83/467, 467 A, 468, 522; 409/218, 220

[56] References Cited

U.S. PATENT DOCUMENTS

| | | | |
|---|---|---|---|
| 2,324,476 | 7/1943 | Becker | 269/900 |
| 4,356,749 | 11/1982 | Spencer | 269/303 |

OTHER PUBLICATIONS

Edward G. Hoffman, Modular Fixturing, p. 66.

Primary Examiner—Frederick R. Schmidt
Assistant Examiner—David A. Holmes
Attorney, Agent, or Firm—Ladas & Parry

[57] ABSTRACT

A fixture includes a base having an index surface. The index surface has a reference hole, 360 positioning holes formed about the reference hole and angularly equally spaced from each other at an interval of one degree, and a plurality of fastener holes formed through the base around the positioning holes. A reference post is inserted removably into the reference hole for abutment of a workpiece thereon. A positioning post is inserted removably into selected one of the positioning holes for abutment of the workpiece thereon. A press member is inserted removably into selected one of the fastener holes and is adjustable to press the workpiece against the indexing surface of the base for holding the workpiece on the base, so that a diagonally provided part of the workpiece to be cut is in parallel with the movement direction of a movable work table.

1 Claim, 10 Drawing Sheets

FIXTURE FOR HOLDING DIFFERENT WORKPIECES IN DIFFERENT POSITIONS THEREON

BACKGROUND OF THE INVENTION

This invention relates to a fixture, and more particularly to a fixture for holding different workpieces in different positions thereon.

When performing milling, drilling, boring, or threading operation on a finish machine equipped with a movable work table which can effect a linear movement relative to a cutter, a diagonally provided part of a workpiece to be cut, i.e. that not provided lengthwise and transversely on the workpiece, must be held on the work table of the finish machine by a specific fixture. Such a fixture is generally used to hold a workpiece in a single position on a work table for machining of a particular part of the workpiece. When the part of the workpiece to be cut is changed, the fixture must be replaced. If a workpiece has several diagonally provided parts to be cut, numerous specific fixtures must be equipped. As a result, the provision of these specific fixtures results in the high manufacturing cost of the products, especially in a manufacture process other than mass production.

SUMMARY OF THE INVENTION

It is therefore the main object of this invention to provide a fixture which can hold different workpieces in different positions on the work table of a finish machine so that the diagonally provided parts of the workpieces can be machined.

According to this invention, the fixture inludes a base having an index surface. The index surface has a reference hole, 360 positioning holes formed along a predetermined number of concentric circles which are centered at the reference hole, and a plurality of fastener holes formed through the base around the outermost circle. The positioning holes are angularly equally spaced from each other at an interval of one degree. The predetermined number is a factor of 360, such as 1, 2, 3, 4, 5, etc. One of the fastener holes is adapted to be engaged with a fastener for fastening the base to a work table of a finish machine having a cutter. The work table can effect a linear movement relative to the cutter.

A reference post is engaged removably with the reference hole at its an end for abutment of a workpiece thereon. A positioning post is engaged removably with selected one of the positioning holes at its an end for abutment of the workpiece thereon. A press member is engaged removably with selected one of the fastener holes at its an end and is adjustable to press the workpiece against the indexing surface of the base for holding the workpiece on the base, so that a diagonally provided part of the workpiece to be cut is in parallel with movement direction of the work table.

Thereby, when the press member is adjusted to release the workpiece therefrom, the positioning post and the press member may be respectively moved into another of the positioning holes and another of the fastener holes. Then, the workpiece may be moved to abut against the reference post and against the positioning post and the press member may be adjusted to press the workpiece against the index surface of the base so as to position and hold the workpiece in another position, permitting another diagonally provided part of the workpiece to be cut.

BRIEF DESCRIPTION OF THE DRAWINGS

Other features and advantages of this invention will become apparent from the following detailed description of a preferred embodiment of this invention with reference to the accompanying drawings in which.

DETAILED DESCRIPTION OF THE PREFERRED EMBODIMENTS

Figure 1A:
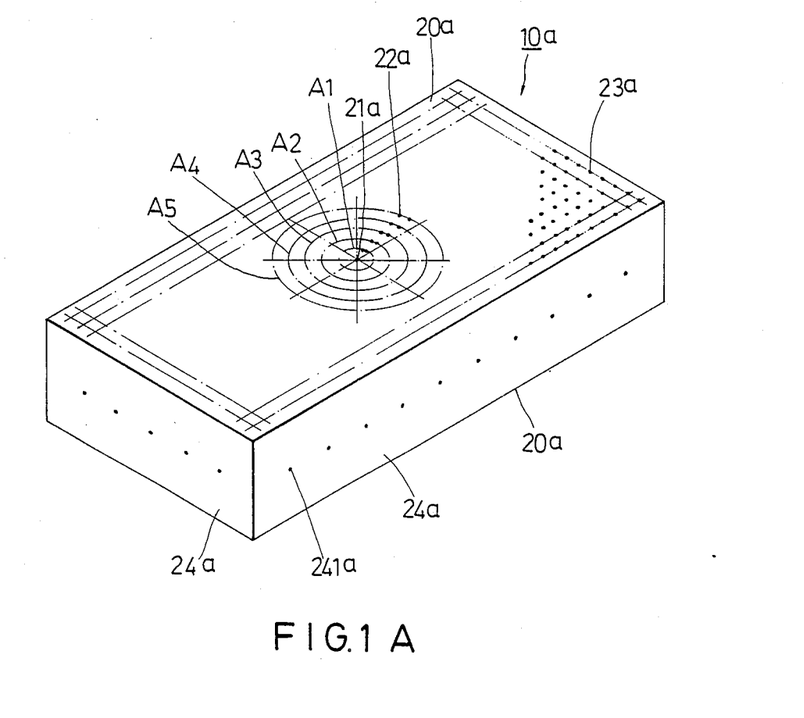
FIGS. 1A to 1F are perspective views showing six embodiments of a base of a fixture according to this invention.
Figure 1B:
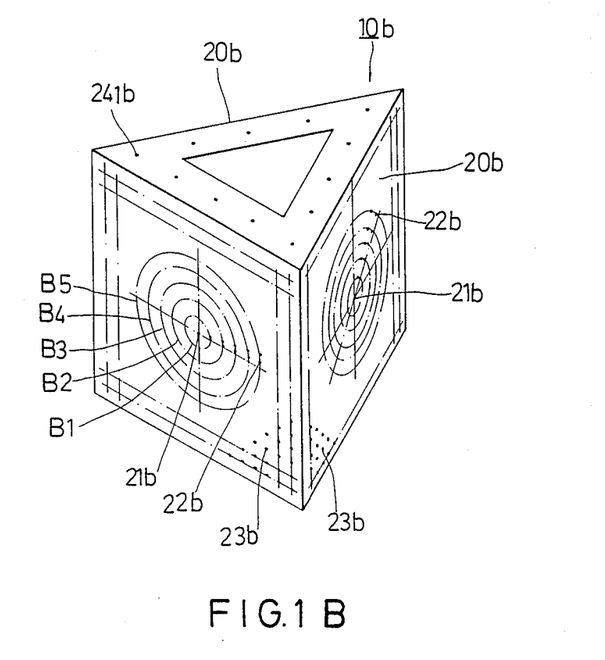
Figure 1C:
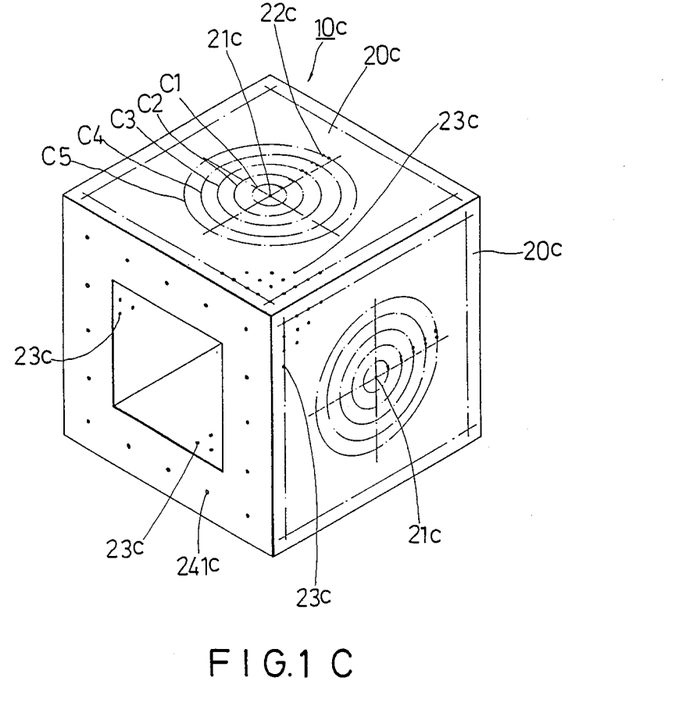
Figure 1D:
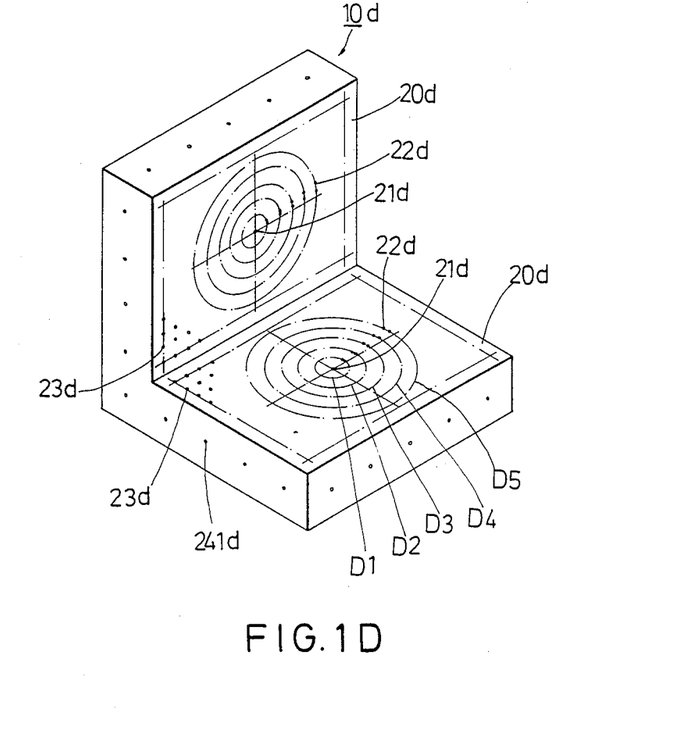
Figure 1E:
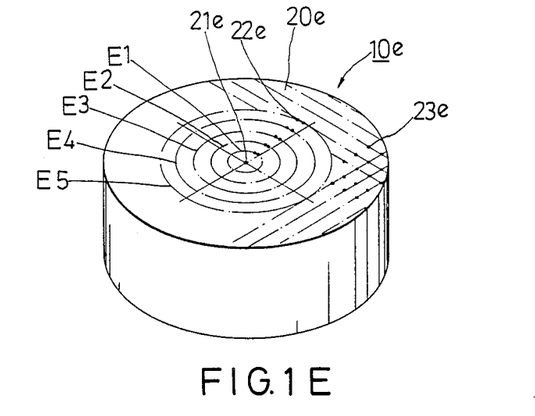
Figure 1F:
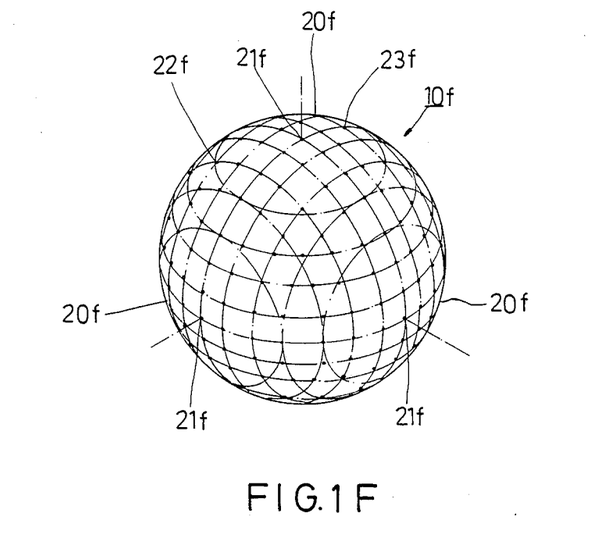

Referring to FIG. 1A, there is shown a base 10a of a fixture according to a first embodiment of this invention. The base 10a is a parallelepiped which has index upper and bottom surfaces 20a. The index surface 20a has a central reference hole 21a which is the center of five concentric circles A1, A2, A3, A4, and A5. Along each of the circles A1, A2, A3, A4, and A5 are formed 72 positioning holes 22a. Thus, the total number of the positioning holes 22a formed in the index surface 20a is 360. The positioning holes 22a are distributed uniformly about the reference hole 21a so that any adjacent two of positioning holes 22a are angularly spaced from each other at an interval of one degree. Certainly, the angles designated by the positioning holes 22a are numbered on the index surface 20a. It is noted that the number of the circles may be changed to another factor of 360, such as 1, 2, 3, 4, 6, etc, in such a manner that the total number of the positioning holes is maintained at 360.

Outside the outermost circle A5, there are formed a plurality of threaded through holes 23a in the index surface 20a. In addition, formed in side surfaces 24a of the base 20a are a plurality of threaded blind holes 241a which are of different diameters for positioning externally threaded workpieces thereon. It is noted that two bases 20a may be interconnected side by side by engaging the threaded blind holes 241a thereof with a stud (not shown).

Referring to Figs. 1B–1F, in which the parts with identical function to that of FIG. 1A are designated by the same digits and different letters, there are shown five alternative embodiments of the base 20a. Unlike the base 20a of FIG. 1A, the bases of Figs. 1B, 1C, 1D, 1E, and 1F are respectively a hollow triangular prism 10b with three index surfaces 20b (only two are shown), a hollow cube 10c with four index surfaces 20c (only two are shown), a L-shape block 10d with two index surfaces 20d, a cylinder 10e with an upper index surface 20e and a lower index surface (not shown), and a sphere 10f with six index surfaces 20f (three are not shown). Each of these index surfaces 20b, 20c, 20d, 20e, and 20f has similarly reference, positioning, and threaded through holes which will not be further described for the purpose of simplicity. It is noted that these bases may be selected to use, depending on the shape of a workpiece and the inclined angle of the diagonally provided part of the workpiece to be machined.

The base 10a is preferably made of metal having magnetic permeability, such as iron, so that it can be attracted by and fastened to a magnetic work table of a grinding machine. When it is used with a non-magnetic work table, such as that of a knee-type milling machine, one or more T-shaped bolts passing through the . T-shaped grooves of the work table can be engaged with the threaded through holes 23a of the base 10a for fastening the base 10a to the work table. It is understood that the base 10a may be made of other material, such as plastics.

Figure 2:
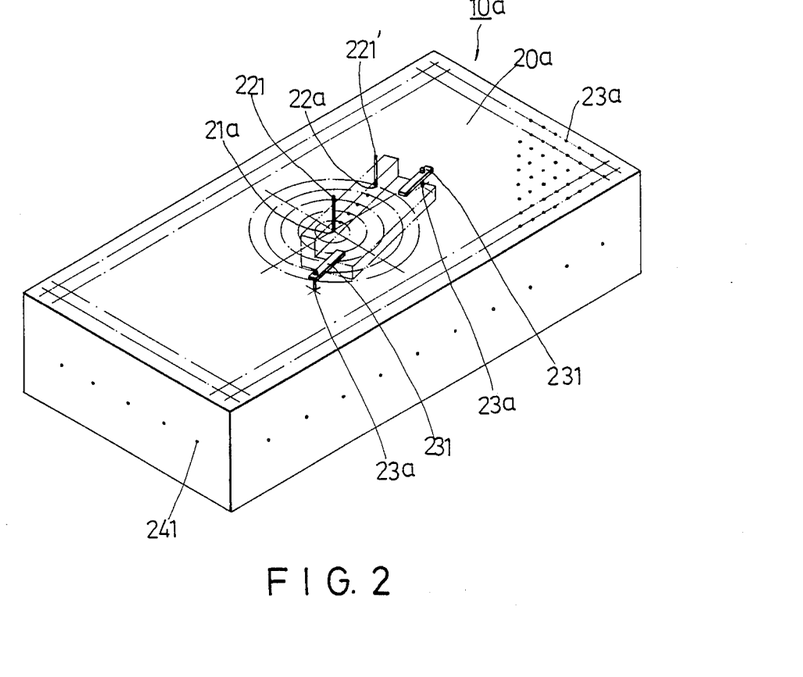
FIG. 2 is a schematic view illustrating how to position and hold a workpiece on the base of FIG. 1A by means of a reference post, a positioning post, and a pair of press members in accordance with this invention.

Referring to FIG. 2, the first base 10a and a workpiece held and positioned on the index surface 20a of the base 10a are shown. In use, as illustrated, a reference post 221 is first inserted tightly int the reference hole 21a and a positioning post 221'is inserted tightly into selected one of the positioning holes 22a. A long side of the workpiece is moved to abut against both the reference post 221 and the positioning post 221'so that the diagonally provided part of the workpiece to be cut can be in line with the feed direction of the work table toward a cutter. Thereafter, two press members 231 are inserted into selected two of the threaded through holes 23a and subsequently adjusted to press the workpiece against the index surface 20a of the base 10a, thereby holding the workpiece on the base 10a.

Figure 2A:
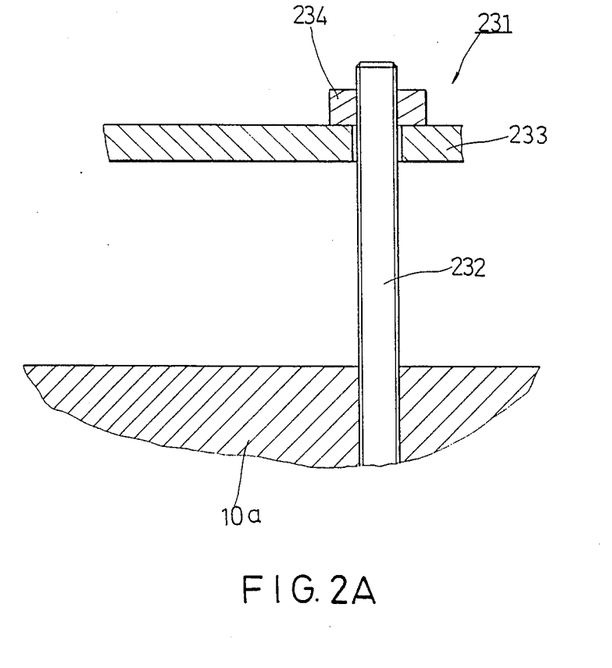
FIG. 2A is a sectional view showing one of the press members.

Referring to FIG. 2A, each of the press members 231 includes a stud 232 engaged threadably with the threaded through hole 23a at its lower end, a press strip 233 sleeved movably on the stud 232, and an adjusting nut 234 engaged threadably with the upper end of the stud 232 for urging the press strip 233 to press the workpiece against the index surface 20a of the base 10a.

Figure 3:
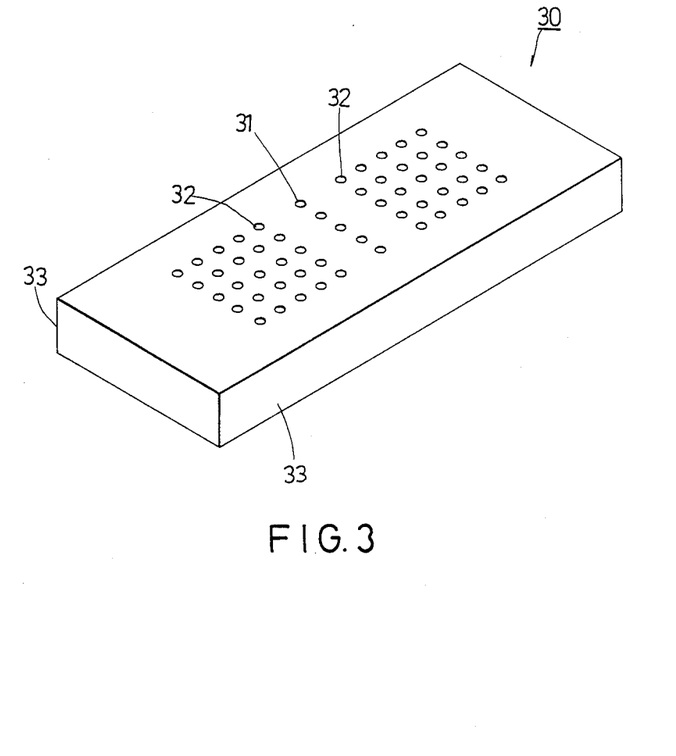
FIG. 3 is a perspective view showing an auxiliary plate forming part of a fixture according to this invention for use with the base of FIG. 1A.

According to this invention, there is also provided an auxiliary plate. In order to incorporate with the base 10a of FIG. 1A, an auxiliary plate 30 shown in FIG. 3 is provided. The plate 30 has two parallel positioning surfaces 33 at its long sides and a sub-index upper surface. Formed in the middle of the sub-index surface are a row of five first through holes 31 which are aligned in a direction perpendicular to the positioning surfaces 33. On each side of the first through holes 31, the sub-index surface further has five rows of second through holes 32 each row of which are aligned with one of the first through holes 31, so that ten rows of through holes are formed in the sub-index surface. In this embodiment, five rows of the through holes in the right of Figure are aligned at an angle of 0.1, 0.2, 0.3, 0.4, and 0.5 degree with respect to the positioning surfaces 33. Also, five rows of the through holes in the left of Figure are aligned at an angle of 0.6, 0.7, 0.8, .0.9, and 1.0 degree with respect to the positioning surfaces 33. The angles designated by the second through holes 32 are of course numbered on the sub-index surface. Each row of second through holes 32 are respectively spaced from the corresponding first through hole 31 at a distance corresponding to the radii of the circles A1, A2, A3, A4, and A5 formed on the index surface 20a.

Figure 4:
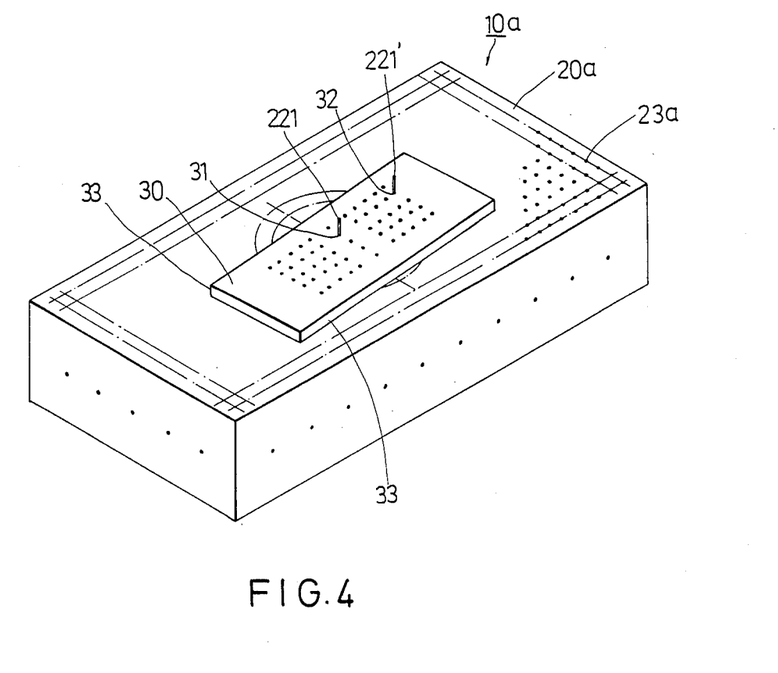
FIG. 4 is a schematic view illustrating how to incorporate the base of FIG. 1A with the auxiliary plate of FIG. 2 in accordance with this invention.

Referring to FIG. 4, when it is desired to position a workpiece on the base 10a while permitting a side of the workpiece to be at an angle with a decimal fraction, such as 5.2 degrees, with respect to the long sides of the base 10a the reference post 221 is first inserted into the reference hole 21a. The positioning post 221' is inserted into the positioning hole 22a which is at an angle of 5 degrees with respect to the long sides of the base 10a. Thereafter, the auxiliary plate 30 is placed on the base 10a while permitting the reference post 221 and the positioning post 221' to respectively pass through the first through hole 31 and the second through hole 32 of the second row in the right of Figure. At this time, the positioning surfaces 33 of the auxiliary plate 30 are at an angle of 5.2 degrees with respect to the long sides of the base 10a. As long as the side of the workpiece is moved to abut against both the reference post 221 and the positioning post 221', the side of the workpiece is also at an angle of 5.2 degrees with respect to the long sides of the base 10a. Finally, the workpiece may be held by two press members 231 (not shown) in a manner described hereinbefore for being cut.

It is noted that both the reference hole 21a and the engagement end of the reference post 221 may be threaded for firm engagement with each other. Similarly, all of the positioning holes 22a and the engagement end of the positioning post 221' may be threaded for the same purpose.

Figure 5:
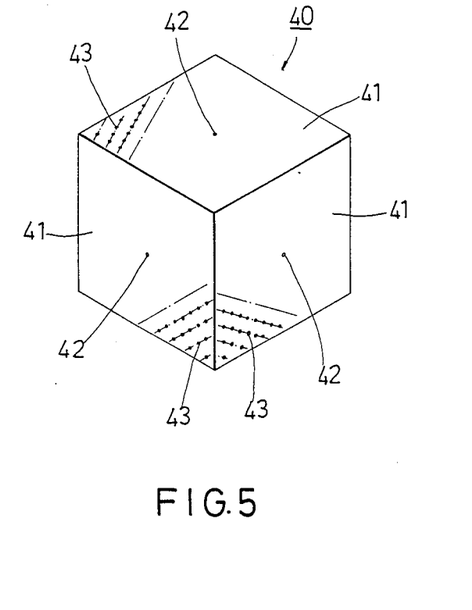
FIG. 5 is a perspective view showing a specific angle positioning block of a fixture according to this invention.

When the angles to be positioned are always commonly employed angles, such as 15, 30, 45, 60, and 75 degrees, a specific angle positioning block 40 shown in FIG. 5 may be used. The positioning block 40 has three index surfaces 41 each of which has a threaded fastener hole 42 and numerous parallel rows of positioning holes 43. The fastener hole 42 is used to engage with a fastener (not shown) for fastening the positioning block 40 to a work table. Each row of the positioning holes 43 formed in first index surface 41 are aligned at an angle of 15 degrees with respect to a side of the first index surface 41. Each row of the positioning holes 43 formed in second index surface 41 are aligned at an angle of 30 degrees with respect to a side of the second index surface 41. Each row of the positioning holes 43 formed in third index surface 41 are aligned at an angle of 45 degrees with respect to a side of the third index surface 41. The positioning holes 43 are used to engage with the reference post, the positioning post, and the press member.

With this invention thus explained, it is apparent that various modifications and variations can be made without departing from the scope and spirit of this invention. It is therefore intended that this invention be limited only as indicated in the appended claims.

I claim:

1. A fixture for fastening a workpiece to a work table of a finish machine having a cutter, said work table being capable of effecting a linear movement relative to said cutter, said fixture comprising:

a base having an index surface, said index surface having a reference hole, a plurality of equally spaced positioning holes formed along a circle which is centered at said reference hole, and a plurality of fastener holes formed through said based around said circle;

means for fastening said base to said work table including one of said fastener holes which is adapted for being engaged with a fastener;

a reference post engaged removably with said reference hole at its end and adapted for confining said workpiece;

a positioning post engaged removably with selected one of said positioning holes at its end and adapted for cooperating with said reference post to confine said workpiece; and a press member engaged removably with selected one of said fastener holes at its end and adjustable to press said workpiece against said indexing surface of said base for holding said workpiece on said base, so that a diagonally provided part of said workpiece to be cut is in parallel with movement direction of said work table;

whereby when said press member is adjusted to release said workpiece therefrom, said positioning post and said press member may be respectively moved into another of said positioning holes and another of said fastener holes; then, said workpiece may be moved to abut against said reference post and against said positioning post and said press member may be adjusted to press said workpiece against said index surface of said base so as to position and hold said workpiece in another position, permitting another diagonally provided part of said workpiece to be cut.

* * * * *